US006195707B1

(12) United States Patent
Minh

(10) Patent No.: US 6,195,707 B1
(45) Date of Patent: Feb. 27, 2001

(54) APPARATUS FOR IMPLEMENTING UNIVERSAL RESOURCE LOCATOR (URL) ALIASES IN A WEB BROWSER AND METHOD THEREFOR

(75) Inventor: Tran Trung Minh, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/181,826

(22) Filed: Oct. 28, 1998

(51) Int. Cl.[7] .................................................. G06F 13/00
(52) U.S. Cl. ............................................................ 709/245
(58) Field of Search ..................................... 709/217–219, 709/223, 229, 245

(56) References Cited

U.S. PATENT DOCUMENTS

| 5,706,501 | 1/1998 | Horikiri et al. ..................... 395/610 |
| 5,751,961 | 5/1998 | Smyk ............................... 395/200.47 |
| 5,764,906 | 6/1998 | Edelstein et al. ............... 395/200.49 |
| 5,974,455 | * 10/1999 | Monier ................................. 709/223 |

FOREIGN PATENT DOCUMENTS 10-78928  3/1998  (JP) .

* cited by examiner

*Primary Examiner*—Robert B Harrell
(74) *Attorney, Agent, or Firm*—Barry S. Newberger; Winstead Sechrest & Minick P.C.; Jeffrey S. LaBaw

(57) ABSTRACT

A method and apparatus for URL alias mechanism is implemented. A user-defined alias is associated with a URL. Aliases and the URL to which each corresponds are contained in a file accessible by a web browser. In response to the entry of an alias during a browsing session, the web browser retrieves the associated URL from the alias file, and accesses the corresponding web page. The alias file may be generated in response to a preference selection in the web browser, and in response to the user selecting to edit the file.

51 Claims, 5 Drawing Sheets

| 404 URL | 406 Alias |
|---|---|
| 404 | 406 |
| 404 | 406 |
| ⋮ | ⋮ |
| 404 | 406 |

Fig. 4

APPARATUS FOR IMPLEMENTING UNIVERSAL RESOURCE LOCATOR (URL) ALIASES IN A WEB BROWSER AND METHOD THEREFOR

TECHNICAL FIELD

The present invention relates in general to data processing systems, and in particular, to web browser methodologies in data processing systems.

BACKGROUND INFORMATION

The worldwide network of computers commonly known as the "Internet" has seen explosive growth in the last several years. This growth has been typically fueled by the introduction and widespread use of "web" browsers that allow for simple graphical user interface-based access to network servers. Such network servers typically support documents formatted as "web pages." The "World Wide Web" (WWW) is a hypertext information and communication system used on the Internet with data communications operating according to a client/server model using a Hypertext Transfer Protocol (HTTP). HTTP is a known application protocol that provides users access to files using a standard page description language referred to as Hypertext Markup Language (HTML). It should be noted that HTML is an application of Standard Generalized Markup Language (SGML), an international standard (ISO 8879) for text information processing. Furthermore, the files that are accessed using HTML may be provided in different formats, such as text, graphics, images, sound, and video, among others. HTML provides basic document formatting and allows the developer to specify "links" to other servers and files. Links are then specified using a Uniform Resource Locator (URL) when an HTML-compliant client browser is used. Upon specification of a URL, a client may make a TCP/IP request to the server identified in the link and receive a "web page" in return, where the "web page" is a document formatted according to HTML.

Entering of a URL often requires the user to input long strings of characters. These may be difficult to remember and may also be prone to errors, requiring the user to find and correct the error in the long character string. One solution in the prior art to the problem of URL entry is the "bookmark." A bookmark facility in a web browser allows the user to save the URL of a current web page to a bookmark file. The user may then later access the bookmark file and return to the web page by selecting the bookmark for the web page. Bookmark lists are often presented to the user in a graphical user interface (GUI) by means of a menu list. As bookmarks are added to the list, the list can become unwieldy, requiring the user to scroll through a long bookmark list to find the desired bookmark. This may be particularly cumbersome in a multi-user environment in which several users are adding bookmarks to the list. A particular user is then required to scroll through a list of bookmarks, many of which may be unfamiliar, in order to find the bookmark for the web page that user wishes to access. Thus, it would be desirable to have in the art an alternative mechanism by which the user might avoid having to repeatedly enter a long URL string to access web pages the user frequently visits.

SUMMARY OF THE INVENTION

The aforementioned needs are addressed by the present invention. Accordingly there is provided, in a first form, a method of universal resource locator (URL) alias implementation. The method includes the step of associating a user defined URL alias with a URL, wherein the URL alias is operable for accessing a web page corresponding to the URL, and storing the URL alias in an alias file, wherein the alias file is operable for accessing to obtain the associated URL.

There is also provided, in a second form a program product adaptable for storage on program storage media. The program product is operable for implementing a universal resource locator (URL) alias mechanism, which includes programming for associating a user defined URL alias with a URL, wherein the URL alias is operable for accessing a web page corresponding to the URL. Also included is programming for storing the URL alias in an alias file, wherein the alias file is operable for accessing to obtain the associated URL.

Additionally there is provided, in a third form, a data processing system for implementing a URL alias mechanism. The data processing system includes circuitry operable for associating a user defined URL alias with a URL, wherein the URL alias is operable for accessing a web page corresponding to the URL, and circuitry operable for storing the URL alias in an alias file, which alias file is operable for accessing to obtain the associated URL.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 schematically illustrates an alias file in accordance with an embodiment of the present invention.

DETAILED DESCRIPTION

Figure 1:
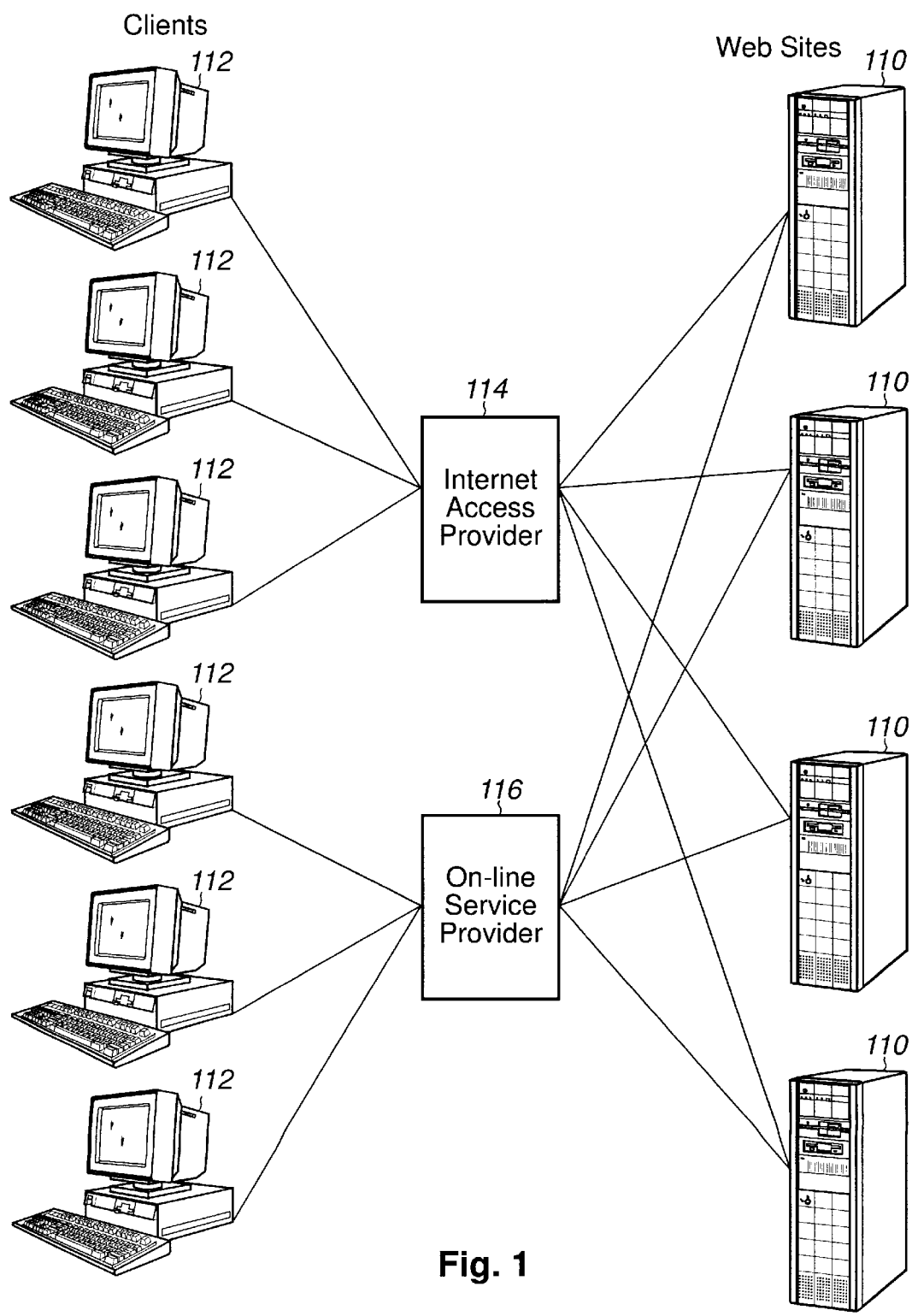
FIG. 1 illustrates, in block diagram form, a communication system in accordance with an embodiment of the present invention.

The present invention provides a data processing system and method for creating an alias file associated with a web browser. In an embodiment of the present invention, the alias file may be created in conjunction with a current browser, such as Netscape™ or Internet Explorer™. Alternatively, an embodiment of the present invention may be incorporated in a new browser. The alias file includes the URL of a web page, and a user defined alias for that URL. The web browser retrieves the URL from the alias file in response to the user entering the alias when the user wishes to visit the web page corresponding to the particular URL. A more detailed description of the implementation of the present invention will subsequently be provided. Prior to that discussion, an environment in which the present invention may be implemented will be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a communication network based on a client-server model typically utilized in the Internet. The subsequent discussion and description of FIG. 1 are provided to illustrate an exemplary Internet environment utilized by the present invention.

Conceptually, the Internet comprises a large network of "servers" 110 that are accessible by "clients" 112. Each of the plurality of clients 112 is typically a personal computer or workstation. Clients 112 access the Internet through some private Internet access provider 114 (such as Internet America™) or an on-line service provider 116 (such as America On-Line™, AT&T WorldNet™, and the like). Each of clients 112 may run on a "browser," which is a known software tool used to access the servers (110) via the access providers (114 and 116). Each server 110 selectively operates a "web site" that supports files in the form of documents and pages. A network path to a server is identified by a uniform resource locator (URL) having a known syntax for defining a network connection.

As previously mentioned, the World Wide Web is a collection of servers on the Internet that utilizes Hypertext Transfer Protocol (HTTP). HTTP is a known application protocol that provides users access to files using a standard page description language known as Hypertext MarkUp Language (HTML). It should be noted that the files may be in different formats, such as text, graphics, images, sound, video, and the like. HTML provides basic document formatting and allows the developer to specify "links" to other servers or files. Use of an HTML-compliant browser involves specification of a link via the URL. Upon such specification, one of the clients 112 may make a TCP/IP request to one of a plurality of servers 110 identified in the link and receive a web page (specifically, a document formatted according to HTML) in return.

Figure 2:
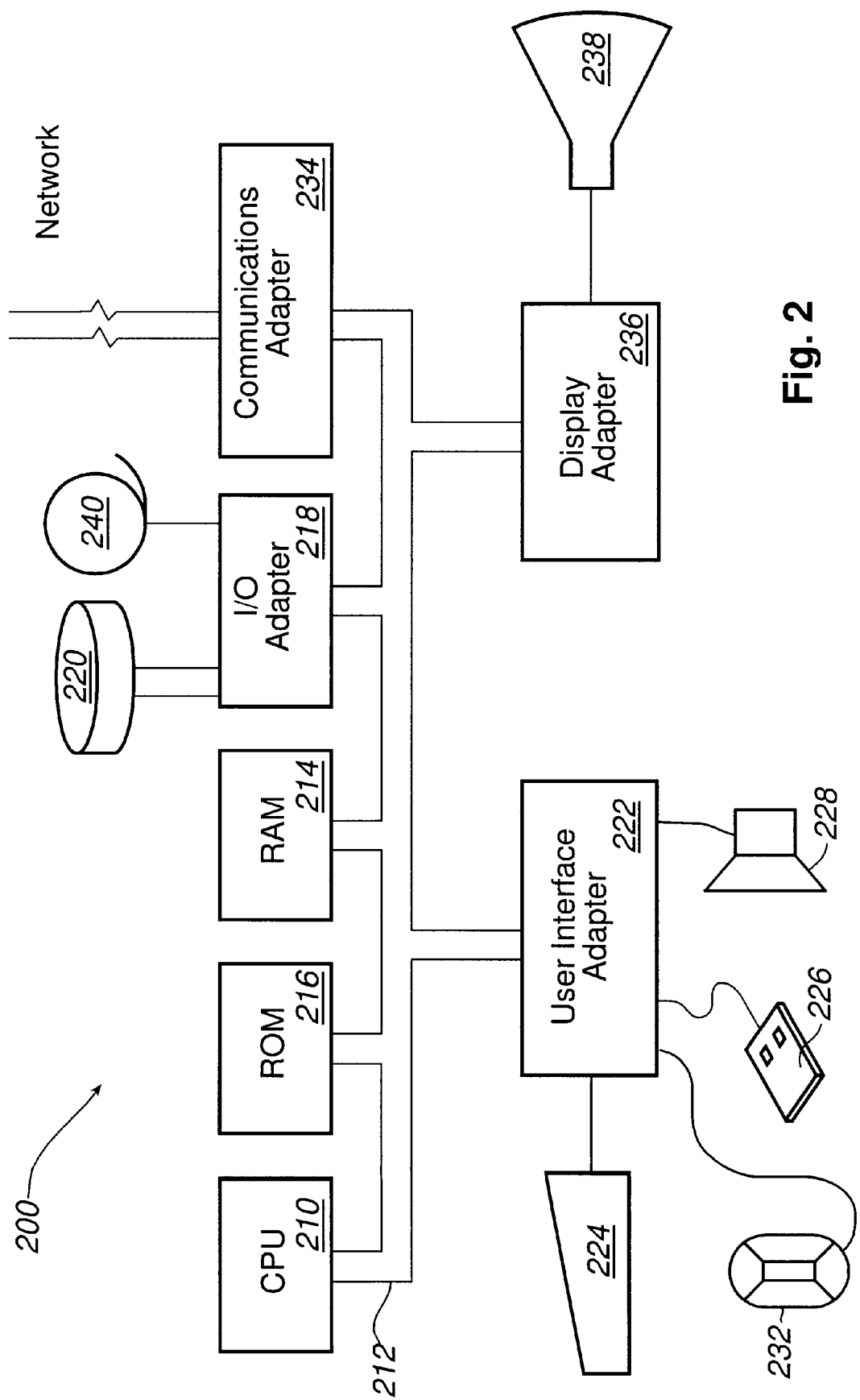
FIG. 2 illustrates, in block diagram form, a data processing system implemented in accordance with an embodiment of the present invention.

FIG. 2 illustrates a data processor 200 that may be utilized to implement a "client" (112) (and/or server (110)) that executes the methodology of the present invention. Data processing system 200 comprises a central processing unit (CPU) 210, such as a microprocessor. CPU 210 is coupled to various other components via System bus 212. Read-only memory (ROM) 216 is coupled to the System bus 212 and includes a basic input/output system (BIOS) that controls certain basic functions of the data processing system 200. Random access memory (RAM) 214, I/O adapter 218, and communications adapter 234 are also coupled to System bus 212. I/O 218 may be a small computer system interface (SCSI) adapter that communicates with a disk storage device 220. Communications adapter 234 interconnects bus 212 with an outside network (e.g., the connections to/from providers 114 and 116) enabling the data processing system to communicate with other such systems. Input/output devices are also connected to System bus 212 via user interface adapter 222 and display adapter 236. Keyboard 224, trackball 232, mouse 226, and speaker 228 are all interconnected to bus 212 via user interface adapter 222. Display monitor 238 is coupled to system bus 212 by display adapter 236. In this manner, a user is capable of inputting to the system through keyboard 224, trackball 232, or mouse 226, and receiving output from the system via speaker 228 and display 238.

Some embodiments of the invention include implementations as a computer system program to execute the method or methods described herein, and as a computer program product. According to the computer system implementation, sets of instructions for executing the method or methods are resident in RAM 214 of one or more computer systems configured generally as described above. Until required by the computer system, the set of instructions may be stored as a computer program product in another computer memory. For example, in disk drive 220 (which may include a removable memory such as an optical disk or floppy disk for eventual use in disk drive 220).

Further, the computer program product can also be stored at another computer and transmitted in a computer readable medium when desired to the user's workstation by a network or by an external network such as the Internet. One skilled in the art would appreciate that the physical storage of the sets of instructions physically changes the medium upon which it is stored so that the medium carries computer-readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting, entering, or other terms that could be associated with the human operator. However, at least for a number of the operations described herein which form a part of the present invention, no action by a human operator is desirable. The operations described are, in large part, machine operations processing electrical signals to generate other electrical signals.

The foregoing has provided a general description of a communication environment that implements one embodiment of the present invention. Execution and operation of the present invention will subsequently be described in greater detail with respect to each of FIGS. 3A–4. As previously mentioned, the data processing system of the present invention generates a URL alias file. The URL alias file so generated permits the user to avoid entering lengthy and often complicated URL strings to access a web page. A description of operation of the data processing system and methodology of the present invention will now be provided in greater detail.

Figure 3A:
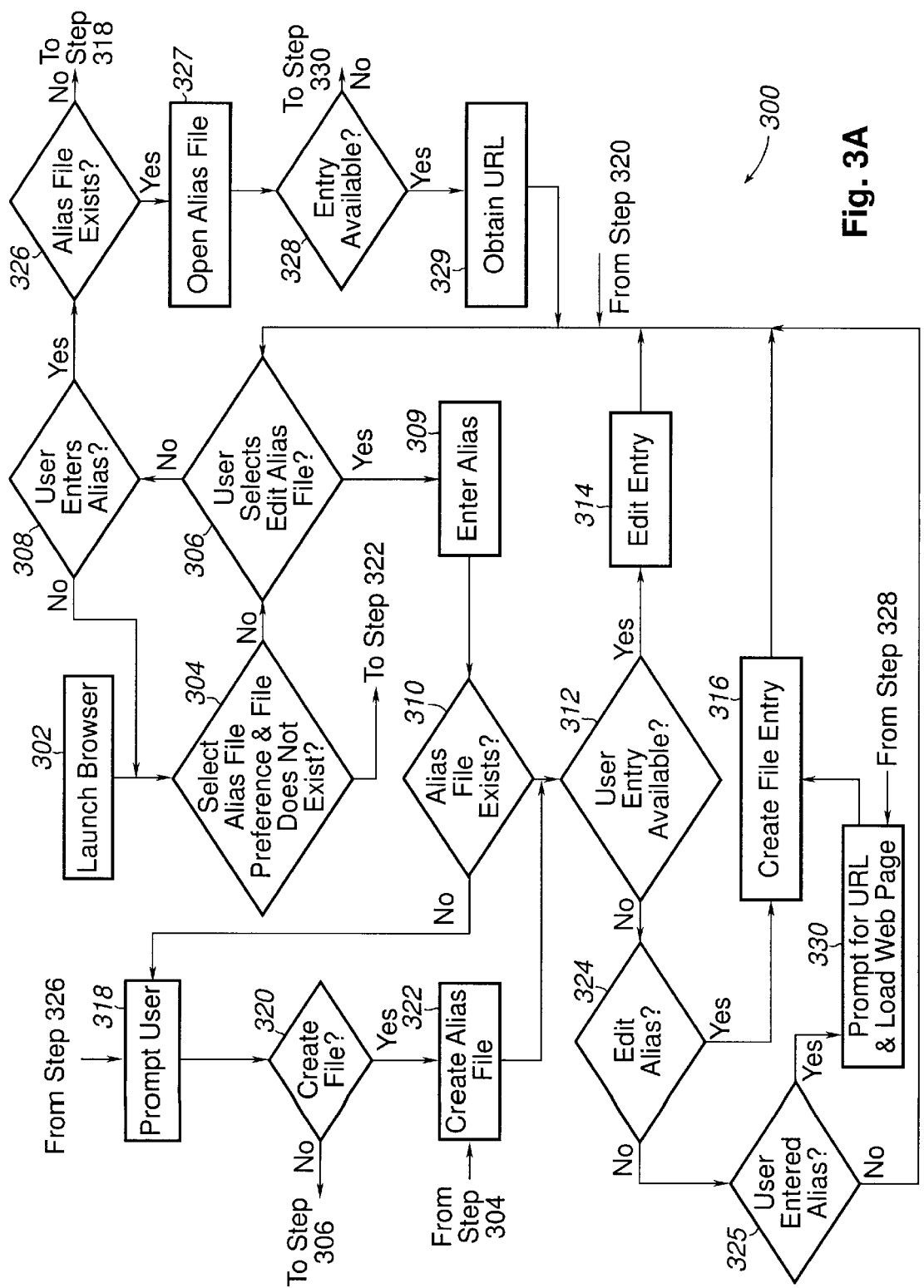
FIG. 3A illustrates, in flowchart form, a methodology implemented to generate and use an alias file in accordance with an embodiment of the present invention.

Refer now to FIG. 3A illustrating a flowchart of a method 300 for URL alias file generation and use according to an embodiment of the present invention. In step 302, a web browser is launched to initiate a browsing session. Method 300 then enters a loop including steps 304, 306 and 308 in which method 300 receives and responds to user input in conjunction with alias file operations.

An alias file may be created in response to a user setting an alias file preference in a predetermined list of preferences. In step 304, if the user has not selected the alias file preference, method 300 continues by following the "No"

branch to step 306. The "No" branch in step 304 is also taken if an alias file already exists. Method 300 may signal the user that a preference file already exists by, for example, in an embodiment using a GUI, placing a "check" or similar mark adjacent to the preference selection corresponding to the alias file option.

Continuing along the "No" branch from step 304, in step 306, method 300 determines if the user has selected to edit the alias file. This selection allows the user to edit a preexisting alias in the alias file, or add a new alias, as will be described below in conjunction with steps 310, 312, 314 and 316.

If, in step 306, the user has selected to edit the alias file, the alias to be edited is entered by the user in step 309. Method 300 then determines, in step 310, if the alias file exists. If the alias file exists, in step 312 it is determined whether the particular alias appears in the alias file. If so, in step 314, the entry is edited in accordance with the information entered in step 309 and method 300 returns to step 306 and continues to loop through steps 306, 308 and 304. If, however, in step 312 the alias entered in step 309 does not appear in the alias file, a file entry for the alias is created in step 316. Step 316 is reached via step 324, following the "Yes" branch therefrom, because the step has been reached in response to alias file edit selection, step 306. Method 300 then returns to step 306, and continues to loop through steps 306, 308 and 304, awaiting a next user entry related to alias file operations.

Returning to step 310, if on entering the alias in step 309, it is determined in step 310 that the alias file does not exist, method 300 continues, in step 318, by prompting the user that the alias file does not exist, and queries the user whether an alias file is to be created. In step 320, the user response is determined, and if the user has chosen to create an alias file, the file is created in step 322. Otherwise, the alias entered in step 309 is ignored and method 300 returns to step 306 to continue looping between steps 306, 308 and 304.

Figure 4:
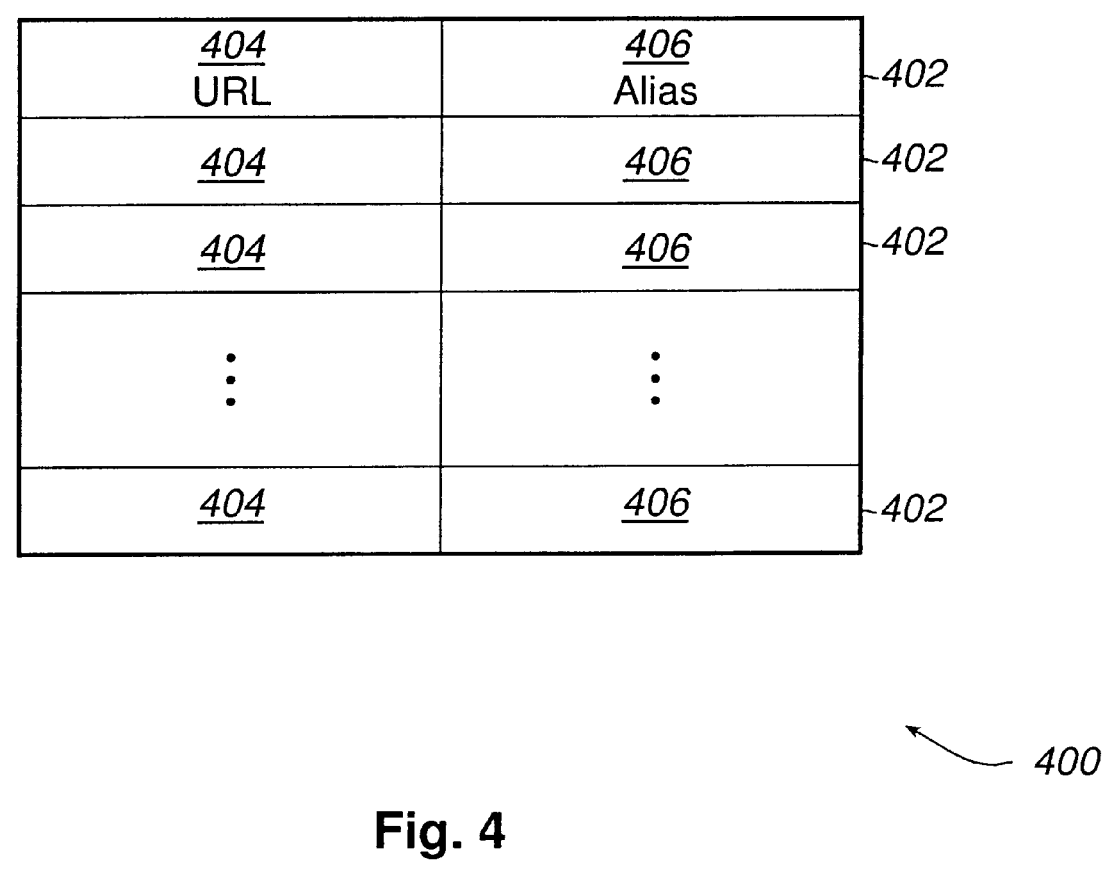

Referring now to FIG. 4, an alias file, such as that created in step 322 is schematically illustrated. Alias file 400 includes a plurality of entries 402, corresponding to URLs and the associated aliases. A portion 404 of each entry includes the URL and a second portion 406 includes the associated alias.

Returning now to FIG. 3A, if the alias file has been created, in step 322, method 300 continues with step 312. However, because the alias file has only been created in step 322, it then contains no entries, and necessarily does not contain an entry corresponding to the alias entered in step 309. Therefore, in step 322, the "No" branch is followed, to step 324.

In step 324, method 300 determines if the user has entered an alias in response to an edit alias selection. Because, in this case, step 324 has been reached by following the "Yes" branch from step 306, method 300 continues by following the "Yes" branch in step 324, to create a file entry, in step 316, for the alias entered in step 309. Method 300 then returns to step 306 to continue looping through steps 306, 308 and 304.

Returning now to step 306, and proceeding along the "No" branch, method 300 determines, in step 308, if the user has entered an alias in order to access the web page corresponding to that alias. A web browser including method 300 must recognize an alias entry. In an embodiment operating according to the HTTP, as described hereinabove, URLs are designated by the first four characters: "http". In such an embodiment of a web browser in accordance with the present invention, a URL alias may be signaled by the characters "httpa".

When method 300, in step 308, detects the character string signaling a URL alias, such as "httpa", the web browser, including method 300, knows that a succeeding portion of the entry corresponds to a URL alias rather than the URL itself. In an alternative embodiment of the present invention, URL aliases may be signaled by alternative, predetermined character sets. For example, the web browser may be configured to access the alias file if the character set does not begin with "http," as a default measure. Therefore, the alias file will be accessed if any character set other than beginning with "http" is entered. Additionally, the user may enter the alias followed by a path, and the corresponding URL represented by the alias will be concatenated with the path to form the URL for the particular page to be accessed, the URL corresponding to the alias being a root portion of the URL for the page. Moreover, it would be understood by an artisan of ordinary skill that the root portion may include a first part of a full path for the page and the "path", as used herein, may include a second part of the full path. In other words, the full path for the page may be segmented by the user in associating an alias with a URL. The first part of the full path in the root portion is then associated with the alias and the remaining part of the full path is then the "path" entered with the alias. Such an embodiment would be within the spirit and scope of the present invention.

Method 300 then continues in step 326 to determine if an alias file exists. If, in step 326, the alias file exists, in step 327 the alias file is opened. In step 328, it is determined if the alias file exists. If so, in step 329, the corresponding URL is obtained and the web browser retrieves the web page having the corresponding URL, as described hereinabove in conjunction with FIG. 1. In another embodiment of the present invention, when in step 308 it is determined that a portion of an alias has been entered, method 300 proceeds through steps 326–329 and compares the portion entered with aliases in the alias file. If an alias corresponding to the portion entered is found, method 300 auto-completes the alias. If the auto-completed alias is not an alias intended by the user, the user overrides the auto-completed alias by continuing to enter the remaining portion of the desired alias.

Otherwise, if, in step 326, the alias file does not exist, the user is prompted to create an alias file in step 318. File creation then proceeds in accordance with the user's selection determined in step 320. If the user decides not to create an alias file, method 300 returns to step 306, and loops through steps 306, 308 and 304. Otherwise, file creation proceeds via steps 322, 312, 324 and 325. Because, in step 325, the user, in step 309, has entered an alias, but an alias file did not exist, step 325 follows the "Yes" branch, and in step 330 the user is prompted for the URL corresponding to the alias entered in step 309. The web browser loads the web page corresponding to the URL. Then, in step 316, the file entry corresponding to the alias and its associated URL is created, and the web browser returns to step 306 to continue looping through steps 306, 308 and 304.

Two paths by which an alias file may be created have been described.

An alias file may also be created by a preference selection, as previously indicated. Returning now to step 304, if the user selects the alias file preference, as discussed hereinabove and the alias file does not exist, method 300 continues with step 322 to create an alias file. Thereafter, step 312 follows the "No" branch because the alias file just created in step 322 is empty, and similarly the "No" branch is followed in step 324 because the file creation operation was not in response to the user editing the alias file. Likewise, in step 325, the "No" branch is followed because the alias file created in step 322 was not created in response to the user entering an alias, step 308. From the "No" branch of step 325, method 300 returns to step 306 to continue looping between steps 306, 308 and 304, wherein the web browser incorporating method 300 performs URL alias operations in response to user inputs as described herein. The user may subsequently create aliases by editing the alias file as described hereinabove in conjunction with step 306.

Figure 3B:
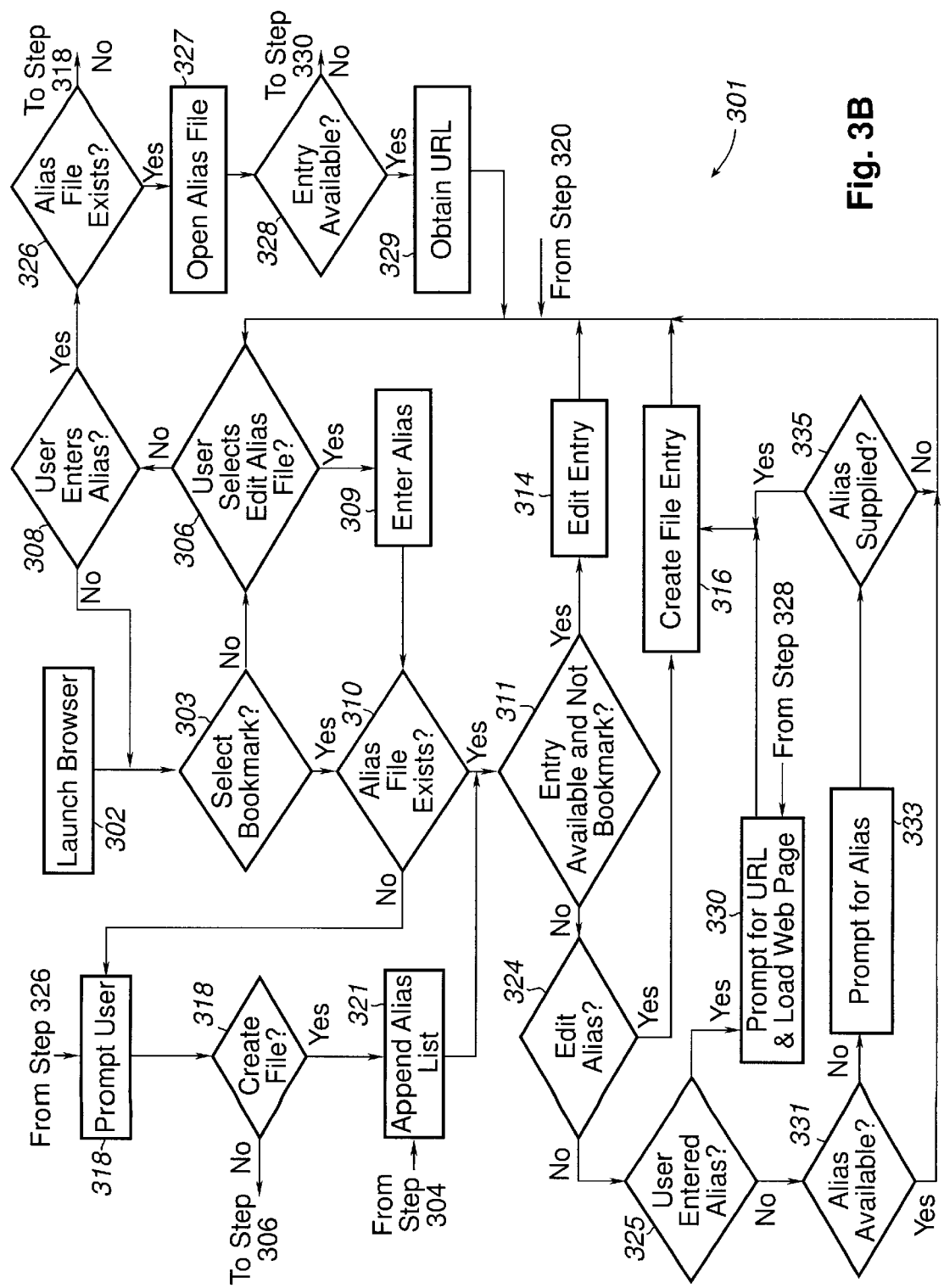
FIG. 3B illustrates, in flowchart form, a methodology implemented to generate and use an alias file according to an alternative embodiment of the present invention.

In an alternative embodiment of the present invention, an alias list may be associated with a bookmark file. In such an embodiment the user may create an alias to a bookmarked page. Refer now to FIG. 3B illustrating a method 301 for URL alias file generation in association with a bookmark file, according to such an embodiment of the present invention. In step 302, the browser is launched Method 301 then enters a loop including steps 303, 306 and 308 in which method 301 receives and responds to user input in conjunction with alias file operations. If in step 303, the user has selected a bookmark, thereby bookmarking a web page, it is determined, in step 310, if an alias file associated with the bookmarks exists. An alias file associated with the bookmark file, may constitute, in an embodiment of the present invention, an alias list appended to the list of bookmarks in a bookmark file. However aliases need not have a corresponding bookmark.

If in step 310, the file does not exist, the user may create one. The process of creating an alias file proceeds through steps 318 and 320 which are the same as discussed in conjunction with method 300 in FIG. 3A. In the interest of brevity, these steps will not be discussed again here. If the user has selected to create an alias file, in step 321, the alias file is appended to the bookmark file. Step 321 is similar to step 320 in which the alias file is created according to the embodiment of the present invention represented by method 300.

Method 301 the proceeds to step 311. If in step 310, the alias file existed, the method 301 would have proceeded directly to step 311, bypassing the file creation steps 381, 320, and 321. In step 311, method 301 determines if an alias file entry corresponding to a user entered alias exists. If, however, in step 311, the step has been reached via a bookmark selection, in which instance no user alias would have been entered, and step 311 then follows the "No" branch. Similarly, steps 324 and 325, which are the same as in method 300, follow their respective "No" branches, to step 331, because this path has been taken in response to a bookmark selection in step 303.

Since the alias file has only been created, the alias file contains no entries. Therefore, in step 331, the alias is necessarily unavailable, and in step 331, the "No" branch is followed. In step 333, the user is prompted for an alias to the bookmarked page. If, in step 335, the user has supplied an alias in response to the prompt, an alias file entry for the alias, linked to the corresponding bookmark, is created, in step 316. If, however, in step 335, the user has not supplied an alias, method 301 returns to step 306, and loops through steps 306, 308 and 303.

If in response to the user selecting a bookmark, step 303, the alias file existed in step 310, the file creation steps are bypassed, as previously discussed. As before, method 301 proceeds by the "No" branches of steps 311, 324 and 325, to step 331. Now, however, the bookmark may have an associated alias because the alias file already existed in step 310, and, in step 331, it is determined if the bookmarked page has an alias. If not, method 301 proceeds via steps 333, 335 and 316, to create one, if the user chooses, as previously described. If the bookmarked page has an alias, method 301 returns to step 306, and loops through steps 306, 308 and 303.

A URL alias file and aliases may also be created in an embodiment according to method 301 by the user entering an alias, in step 308, or by the user selecting to edit an alias file, in step 306. Alias file and alias creation proceed in exactly the same way as in the embodiment of the invention in accordance with method 300. Therefore, the discussion of steps 306 and 308, and the creation of an alias files and aliases in response thereto will not be repeated here. Additionally, it would be understood by an artisan of ordinary skill that an embodiment of the present invention may include the combination of portions of method 300 and portions of method 301, and such an embodiment would be within the spirit and scope of the present invention.

A web browser including URL alias creation and use methods in accordance with the present invention allows a user to access web pages without having to enter a cumbersome URL character string. An alias file may be created in response to a user selected preference, in response to the user entering a URL alias when a URL alias file does not exist, when the user attempts to edit a URL alias and a URL alias file does not exist, or in response to bookmarking a web page. The URL alias file contains entries corresponding to the URLs for user selected web pages. Associated with each URL is a user defined URL alias. The web browser including URL alias method 300, or alternatively method 301, according to embodiments of the present invention may access web pages in response to the user entering the corresponding URL alias. The web browser recognizes URL aliases and accesses the URL alias file containing the URL entries and retrieves the URL corresponding to the URL alias entered by the user. The web browser then retrieves the web page using standard Internet protocols, such as HTTP, described hereinabove. However, it would be understood by an artisan of ordinary skill that URL alias methods according to the present invention are not restricted to the HTTP, and may be used with other Internet protocols such as LDAP, the Lightweight Directory Access Protocol. LDAP is a known application protocol that provides users access to directories. In particular, the protocol is targeted to management applications and browser applications that provide read/write access to directories.

Although the present invention and its advantages have been described in detail, it should be understood that various changes, substitutions and alterations can be made herein without departing from the spirit and scope of the invention as defined by the appended claims.

What is claimed is:

1. A method of using a Uniform Resource Locator (URL) alias comprising the steps of:

entering a URL alias;

opening a URL alias file in response to said step of entering said URL alias;

creating said URL alias file in response to said step of entering said URL alias, if said alias file does not exist; and retrieving a URL corresponding to said URL alias.

2. The method of claim 1 further comprising the step of editing said URL alias file.

3. The method of claim 2 wherein said step of editing said URL alias file comprises the step of creating a file entry corresponding to said URL alias.

4. The method of claim 3 wherein said step of creating a file entry is in response to bookmarking a web page.

5. The method of claim 2 wherein said step of editing said URL alias file is in response to a user selecting to edit an alias file.

6. The method of claim 2 further comprising the step of entering said URL in response to said prompting step.

7. The method of claim 1 further comprising the step of accessing a web page corresponding to said URL obtained in said retrieving step.

8. The method of claim 7 wherein said step of accessing said web page includes the step of entering a URL alias and a path for said web page, wherein said path is concatenated with said URL corresponding to said alias, and wherein said URL comprises a root portion of a URL of said page.

9. The method of claim 1 further comprising the step of prompting a user to create said alias file.

10. The method of claim 1 further comprising the step of prompting a user for said URL corresponding said URL alias.

11. The method of claim 1 wherein said URL alias file is appended to a bookmark file.

12. A data processing system for implementing a universal resource locator (URL) alias mechanism comprising:
 circuitry operable for associating a user defined URL alias with a URL, wherein said URL alias is operable for accessing a web page corresponding to said URL;
 circuitry operable for storing said URL alias in an alias file, wherein said alias file is operable for accessing to obtain said associated URL; and
 circuitry operable for creating said alias file in response to a first user input for accessing said alias file.

13. The data processing system of claim 12 wherein said first user input comprises bookmarking a web page.

14. The data processing system of claim 13 wherein said alias file is appended to a bookmark file.

15. The data processing system of claim 14 wherein said circuitry operable for associating said user defined alias with said URL comprises:
 circuitry operable for entering said URL alias; and
 circuitry operable for associating said URL alias with a URL corresponding to said bookmarked page.

16. The data processing system of claim 12 wherein said first user input comprises an edit alias file request.

17. The data processing system of claim 16 further comprising circuitry operable for editing said alias file.

18. The data processing system of claim 12 further comprising circuitry operable for accessing a web page corresponding to said URL in response to an entry of said URL alias.

19. The data processing system of claim 18 wherein said circuitry operable for accessing said web page includes:
 circuitry operable for entering a URL alias and a path for said web page; and
 circuitry operable for concatenating said path with said URL corresponding to said alias, and wherein said URL comprises a root portion of a URL of said page.

20. The data processing system of claim 12 further comprising circuitry operable for opening said alias file in response to an entry of said URL alias.

21. The data processing system of claim 12 wherein said alias file includes a plurality of URL aliases and associated URLs.

22. The data processing system of claim 12 wherein said first user input comprises a URL alias.

23. The data processing system of claim 12 wherein said first user input comprises a preference selection.

24. A method of universal resource locator (URL) alias implementation comprising the steps of:
 associating a user defined URL alias with a URL, wherein said URL alias is operable for entry in lieu of said URL thereby accessing a web page corresponding to said URL;
 storing said URL alias in an alias file, wherein said alias file is operable for accessing to obtain said associated URL; and
 creating said alias file in response to a first user input for accessing said alias file.

25. The method of claim 24 wherein said first user input comprises bookmarking a web page.

26. The method of claim 25 wherein said alias file is appended to a bookmark file.

27. The method of claim 25 wherein said step of associating said user defined URL alias with said URL comprises the steps of:
 inputting said URL alias; and
 associating said URL alias with a URL corresponding to said bookmarked page.

28. The method of claim 24 wherein said first user input comprises an edit alias file request.

29. The method of claim 28 further comprising the step of editing said alias file.

30. The method of claim 24 further comprising the step of accessing a web page corresponding to said URL in response to an entry of said URL alias.

31. The method of claim 30 wherein said step of accessing said web page includes the step of entering a URL alias and a path for said web page, wherein said path is concatenated with said URL corresponding to said alias, and wherein said URL comprises a root portion of a URL of said page.

32. The method of claim 24 further comprising the step of opening said alias file in response to an entry of said URL alias.

33. The method of claim 24 wherein said alias file includes a plurality of URL aliases and associated URLs.

34. The method of claim 24 wherein said first user input comprises a URL alias.

35. The method of claim 24 wherein said first user input comprises a preference selection.

36. A program product adaptable for storage on program storage media, the program product operable for implementing a universal resource locator (URL) alias mechanism comprising:
 programming for associating a user defined URL alias with a URL, wherein said URL alias is operable for accessing a web page corresponding to said URL;
 programming for storing said URL alias in an alias file, wherein said alias file is operable for accessing to obtain said associated URL; and
 programming for creating said alias file in response to a first user input for accessing said alias file.

37. The program product of claim 36 wherein said first user input comprises bookmarking a web page.

38. The program product of claim 37 wherein said alias file is appended to a bookmark file.

39. The program product of claim 37 wherein said programming for associating said user defined alias with said URL comprises:
 programming for inputting said URL alias; and
 programming for associating said URL alias with a URL corresponding to said bookmarked page.

40. The program product of claim 36 wherein said first user input comprises an edit alias file request.

41. The program product of claim 40 further comprising programming for editing said alias file.

42. The program product of claim 36 further comprising programming for accessing a web page corresponding to said URL in response to an entry of said URL alias.

43. The program product of claim 42 wherein said programming for accessing said web page further includes:
   programming for entering a URL alias and a path for said web page; and
   programming for concatenating said path with said URL corresponding to said alias, and wherein said URL comprises a root portion of a URL of said page.

44. The program product of claim 36 further comprising the programming for opening said alias file in response to an entry of said URL alias.

45. The program product of claim 36 wherein said alias file includes a plurality of URL aliases and associated URLs.

46. The program product of claim 36 wherein said first user input comprises a URL alias.

47. The program product of claim 36 wherein said first user input comprises a preference selection.

48. A method of universal resource locator (URL) alias implementation comprising the steps of:
   associating a user defined URL alias with a URL, wherein said URL alias is operable for entry in lieu of said URL thereby accessing a web page corresponding to said URL;
   storing said URL alias in an alias file, wherein said alias file is operable for accessing to obtain said associated URL; and
   entering a URL alias and a path for said web page, wherein said path is concatenated with said URL corresponding to said alias, and wherein said URL comprises a root portion of a URL of said page.

49. A program product adaptable for storage on program storage media, the program product operable for implementing a universal resource locator (URL) alias mechanism comprising:
   programming for associating a user defined URL alias with a URL, wherein said URL alias is operable for accessing a web page corresponding to said URL;
   programming for storing said URL alias in an alias file, wherein said alias file is operable for accessing to obtain said associated URL; programming for entering a URL alias and a path for said web page; and
   programming for concatenating said path with said URL corresponding to said alias, and wherein said URL comprises a root portion of a URL of said page.

50. A data processing system for implementing a universal resource locator (URL) alias mechanism comprising:
   circuitry operable for associating a user defined URL alias with a URL, wherein said URL alias is operable for accessing a web page corresponding to said URL;
   circuitry operable for storing said URL alias in an alias file, wherein said alias file is operable for accessing to obtain said associated URL;
   circuitry operable for entering a URL alias and a path for said web page; and
   circuitry operable for concatenating said path with said URL corresponding to said alias, and wherein said URL comprises a root portion of a URL of said page.

51. A method of using a Uniform Resource Locator (URL) alias comprising the steps of:
   entering a URL alias;
   opening a URL alias file in response to said step of entering said URL alias;
   retrieving a URL corresponding to said URL alias; and
   entering a path for a web page, wherein said path is concatenated with said URL corresponding to said alias, and wherein said URL comprises a root portion of a URL of said page.

* * * * *